(No Model.)

H. C. ADDIS.
WINDMILL TOWER.

No. 364,077. Patented May 31, 1887.

Witnesses
F. L. Ouraud
Edward Stanton

Inventor
Henry C. Addis
By Attorneys,
Louis Bagger & Co.

UNITED STATES PATENT OFFICE.

HENRY C. ADDIS, OF COUNCIL BLUFFS, IOWA.

WINDMILL-TOWER.

SPECIFICATION forming part of Letters Patent No. 364,077, dated May 31, 1887.

Application filed March 19, 1887. Serial No. 231,492. (No model.)

*To all whom it may concern:*

Be it known that I, HENRY C. ADDIS, a citizen of the United States, and a resident of Council Bluffs, in the county of Pottawattamie and State of Iowa, have invented certain new and useful Improvements in Windmill-Towers or Derricks; and I do hereby declare that the following is a full, clear, and exact description of the invention, which will enable others skilled in the art to which it appertains to make and use the same, reference being had to the accompanying drawings, which form a part of this specification, and in which—

Figure 1:
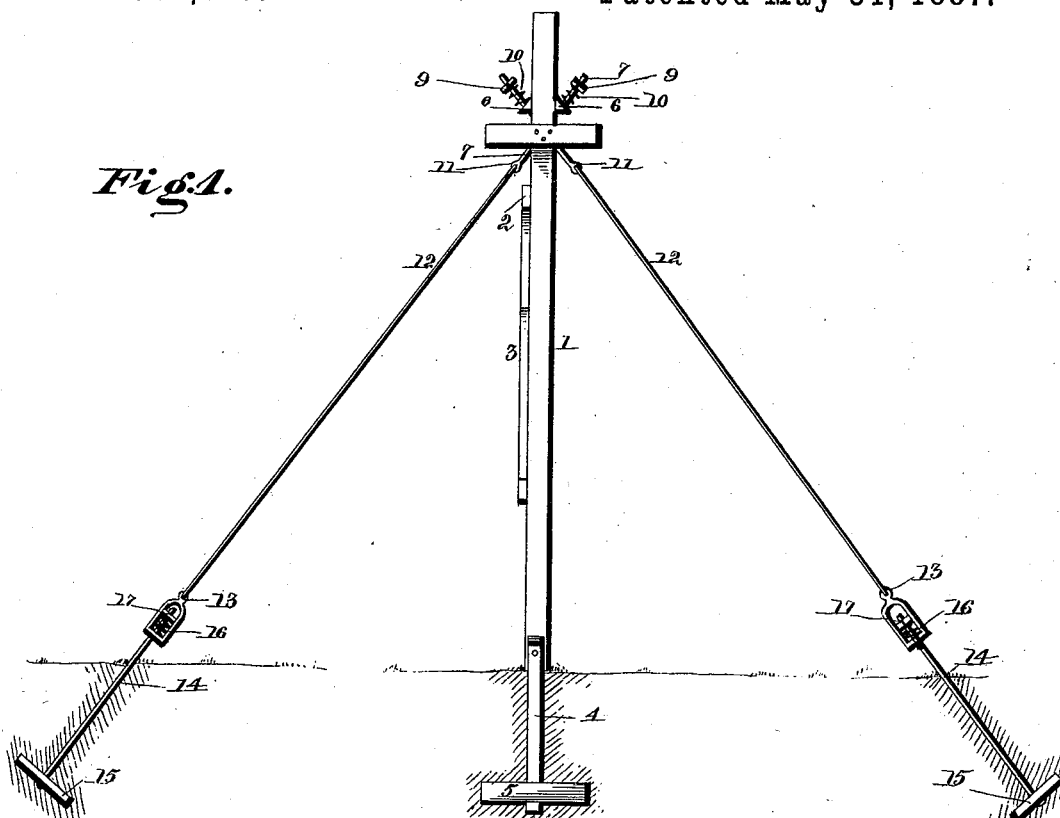
Figure 2:
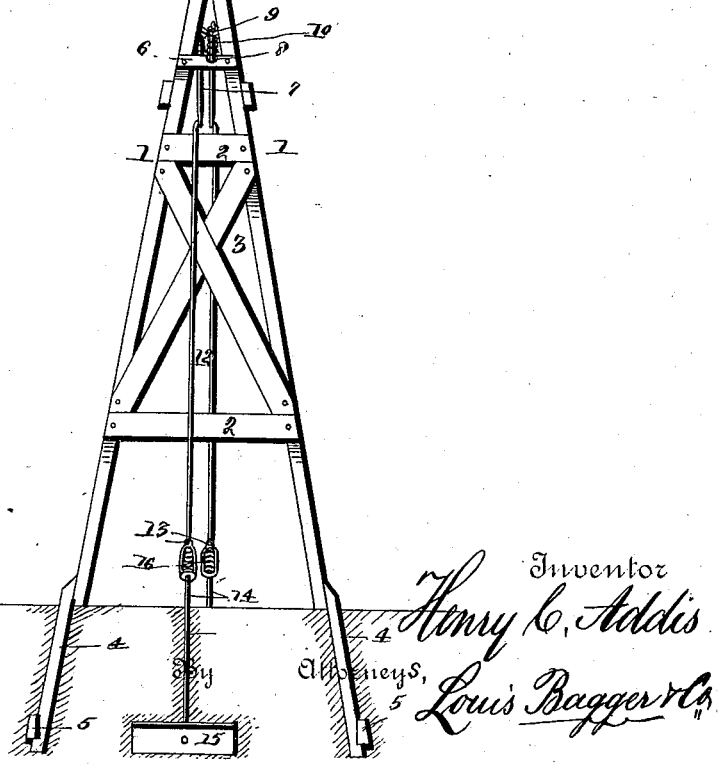

Figure 1 is a side view of my improved windmill-tower or derrick-frame, and Fig. 2 is a view taken at right angles to the former view.

Similar numerals of reference indicate corresponding parts in both the figures.

My invention has relation to towers for windmills or frames for derricks or similar upright frames; and it consists in the improved construction and combination of parts of such a frame, as hereinafter more fully described and claimed.

In the accompanying drawings, the numerals 1 indicate the two converging posts, which are suitably connected by means of cross-pieces 2 and braces 3, and the lower ends of these posts are secured to two anchor-posts, 4, secured in the ground and provided with cross-pieces 5 at their lower ends, preventing them from being drawn out of the ground. The upper ends of the posts are connected by means of cross-pieces 6, having their outer faces inclined, and screw-threaded bolts 7 pass through perforations 8 in the centers of these cross-pieces, and are provided with nuts 9 at their upper ends, springs 10, of metal or rubber or any other yielding material, being interposed between the nuts and the faces of the cross-pieces. The lower ends of the bolts are formed with eyes 11, and guy ropes or chains 12 are secured to these eyes, and are secured with their lower eyed ends, 13, to screw-threaded bolts or rods 14, having anchor-plates 15 at their lower ends and buried in the ground, yielding-springs 16 being preferably interposed between the eyed ends of the guy ropes or chains and the nuts 17 upon the threaded ends of the bolts or rods.

It will thus be seen that the frame, which may be used as a windmill-tower, derrick-frame, or for any other purpose where an upright frame is desired, will only have two posts, being braced and supported by the guy ropes or chains, thus simplifying the construction of the frame and rendering the frame much lighter than the style of frame usually employed, while this frame will possess the same strength and stability as the old style of frame or tower.

The yielding springs interposed between the nuts and the cross-pieces, and between the nuts and the lower eyed ends of the guy-ropes or chains, or between either parts only, will serve to cushion or accommodate the contraction and expansion of the guy ropes or chains by cold or heat, preventing atmospheric changes from having any influence on the stability of the frame, and allowing a very slight yield in extremely hard storms, while being sufficiently stiff to prevent any yield in ordinary weather.

Having thus described my invention, I claim and desire to secure by Letters Patent of the United States—

1. In a windmill-tower, derrick-frame, or other upright frame, the combination of two posts having cross-pieces and braces connecting them and converging toward their upper ends, anchor-posts secured in the ground, and having the lower ends of the posts secured to them, and guy ropes or chains secured at their upper ends to the cross-pieces connecting the upper ends of the posts, and having anchors at their lower ends secured in the ground, as and for the purpose shown and set forth.

2. In a windmill-tower, derrick-frame, or similar upright frame, the combination of two posts converging at their upper ends and connected by means of cross-pieces and braces, and having cross-pieces near their upper ends formed with inclined outer faces, anchor-posts buried in the ground and having cross-pieces at their lower ends, and having the lower ends of the posts secured to them, and guy ropes or chains having screw-threaded bolts at their upper ends inserted through the cross-pieces connecting the upper ends of the posts, and having yielding springs interposed between their nuts and the inclined faces of the cross-pieces, and having their lower eyed ends secured to nutted rods having anchor-plates at their lower ends, and yielding-springs interposed between the eyes and the nuts, as and for the purpose shown and set forth.

In testimony that I claim the foregoing as my own I have hereunto affixed my signature in presence of two witnesses.

HENRY C. ADDIS.

Witnesses:
J. W. MORSE,
D. P. HOWES.